US012424789B2

(12) United States Patent
McKee et al.

(10) Patent No.: US 12,424,789 B2
(45) Date of Patent: Sep. 23, 2025

(54) HOUSING FOR A CONNECTOR OF A CONNECTOR SYSTEM

(71) Applicant: TE Connectivity Services GmbH, Schaffhausen (CH)

(72) Inventors: Kevin McKee, Hemet, CA (US); David Allen Klein, Winston Salem, NC (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 1133 days.

(21) Appl. No.: 17/351,463

(22) Filed: Jun. 18, 2021

(65) Prior Publication Data

US 2022/0045460 A1 Feb. 10, 2022

Related U.S. Application Data

(60) Provisional application No. 63/061,337, filed on Aug. 5, 2020.

(51) Int. Cl.

| | |
|---|---|
| ***H01R 13/627*** | (2006.01) |
| ***H01R 13/11*** | (2006.01) |
| ***H01R 13/24*** | (2006.01) |
| ***H01R 13/502*** | (2006.01) |

(52) U.S. Cl.

CPC ......... *H01R 13/6275* (2013.01); *H01R 13/11* (2013.01); *H01R 13/2407* (2013.01); *H01R 13/502* (2013.01)

(58) Field of Classification Search

CPC ............... H01R 13/6275; H01R 13/11; H01R 13/2407; H01R 13/502; H01R 13/635; H01R 13/111; H01R 13/533; H01R 13/639; H01R 13/5025

See application file for complete search history.

(56) References Cited

U.S. PATENT DOCUMENTS

| | | | | |
|---|---|---|---|---|
| 6,939,159 B1 * | 9/2005 | Klein | H01R 13/6272 439/378 |
| 7,153,172 B2 * | 12/2006 | Milligan | H01R 13/533 439/752 |
| 8,926,363 B2 * | 1/2015 | Klein | H01R 13/5812 439/587 |
| 2002/0076964 A1 * | 6/2002 | Weisz-Margulescu | H01R 24/40 439/263 |
| 2004/0171288 A1 * | 9/2004 | Banas | H01R 13/506 439/135 |

(Continued)

FOREIGN PATENT DOCUMENTS

DE 102006060620 A1 7/2008

OTHER PUBLICATIONS

Extended European Search Report, European Application No. 21189627.9-1201, European Filing Date, Dec. 16, 2021.

*Primary Examiner* — Abdullah A Riyami
*Assistant Examiner* — Nader J Alhawamdeh

(57) ABSTRACT

A housing for a connector includes a main body having a plurality of exterior sides and a resilient shell extending from the exterior sides. The resilient shell includes a first resilient section having a first support connected to the exterior sides and a cantilever disposed at an end of the first support opposite the main body. The cantilever is separated by a distance from at least one of the exterior sides and is elastically deflectable toward the at least one of the exterior sides.

14 Claims, 11 Drawing Sheets

(56) References Cited

U.S. PATENT DOCUMENTS

| | | | | |
|---|---|---|---|---|
| 2013/0230996 | A1* | 9/2013 | Klein | H01R 13/533 439/271 |
| 2014/0242840 | A1* | 8/2014 | Dang | H01R 13/6586 439/607.01 |
| 2016/0093984 | A1* | 3/2016 | Iwamoto | H01R 13/65915 439/607.55 |
| 2019/0280418 | A1* | 9/2019 | Mechteridis | H01R 13/5045 |
| 2020/0295502 | A1* | 9/2020 | Tanaka | H01R 13/5213 |
| 2020/0395700 | A1* | 12/2020 | Pavlovic | H04W 12/069 |
| 2022/0045460 | A1* | 2/2022 | McKee | H01R 13/5025 |

* cited by examiner

HOUSING FOR A CONNECTOR OF A CONNECTOR SYSTEM

CROSS-REFERENCE TO RELATED APPLICATIONS

This application claims priority under 35 U.S.C. § 119 to U.S. Provisional Patent Application No. 63/061,337, filed on Aug. 5, 2020.

FIELD OF THE INVENTION

The present invention relates to a connector system and, more particularly, to a connector system in which movement between a first connector matable with a second connector is reduced.

BACKGROUND

In connector systems, a first connector having a first terminal is matable with a second connector having a second terminal. The first connector and the second connector are often designed with clearances for ease of assembly, given the tolerances related to manufacturing the components of the first connector and the second connector. The clearances, however, allow relative motion to occur between the first connector and the second connector in a mated state of the connector system. Vibration, shock, or other forces on the connector system can consequently lead to wear on the terminals and eventual failure of the connector system.

SUMMARY

A housing for a connector includes a main body having a plurality of exterior sides and a resilient shell extending from the exterior sides. The resilient shell includes a first resilient section having a first support connected to the exterior sides and a cantilever disposed at an end of the first support opposite the main body. The cantilever is separated by a distance from at least one of the exterior sides and is elastically deflectable toward the at least one of the exterior sides.

BRIEF DESCRIPTION OF THE DRAWINGS

The invention will now be described by way of example with reference to the accompanying Figures, of which.

DETAILED DESCRIPTION OF THE EMBODIMENTS

Figure 1:
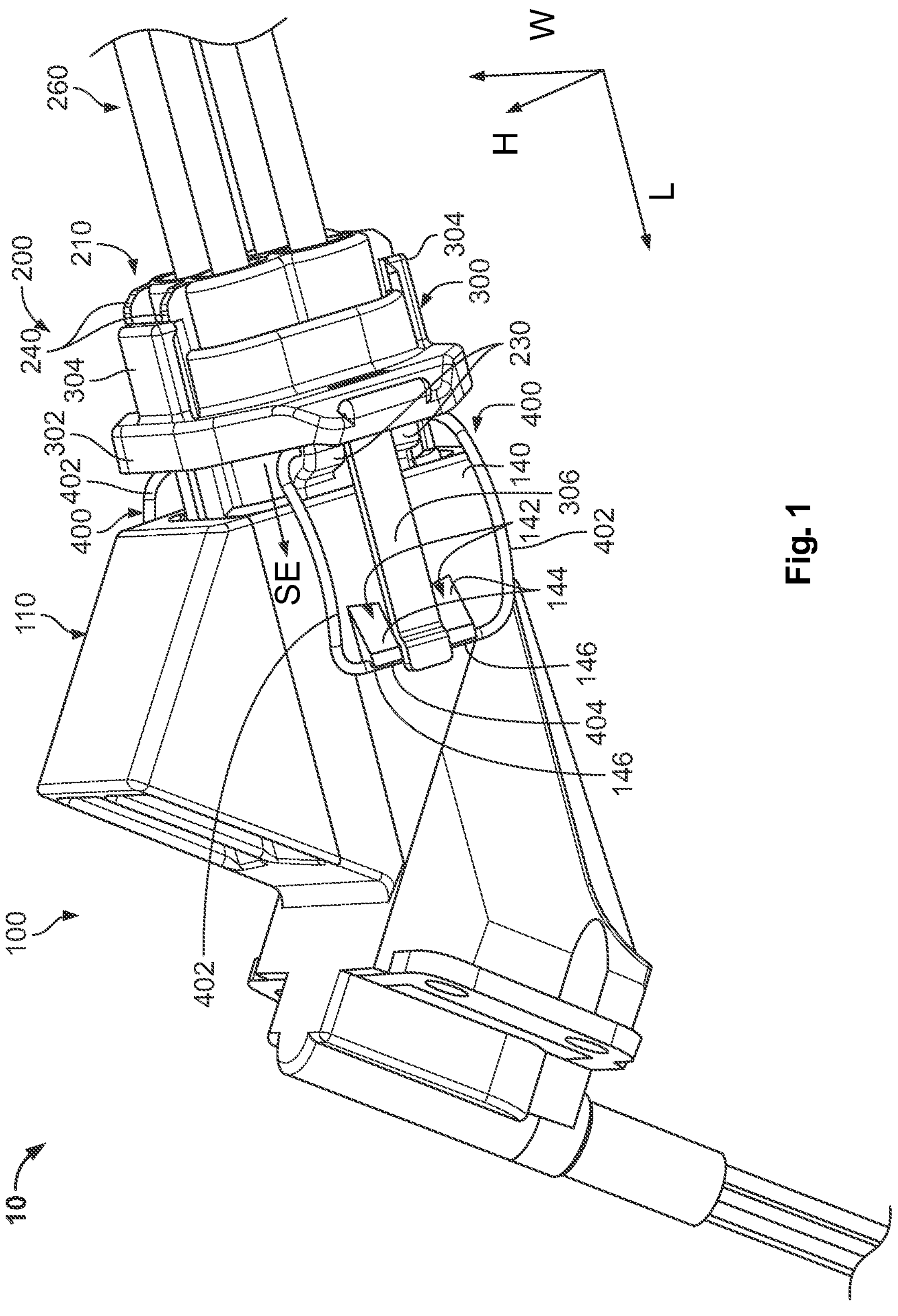
FIG. 1 is a perspective view of a connector system according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Throughout the drawings, only some of a plurality of like elements may be labeled with reference numbers for clarity of the drawings. The reference number labels and description herein, however, apply equally to each of the identical members shown in the drawings.

A connector system 10 according to an embodiment, as shown in FIG. 1, includes a first connector 100 and a second connector 200 matable with the first connector 100 to electrically connect the first connector 100 and the second connector 200.

Figure 2:
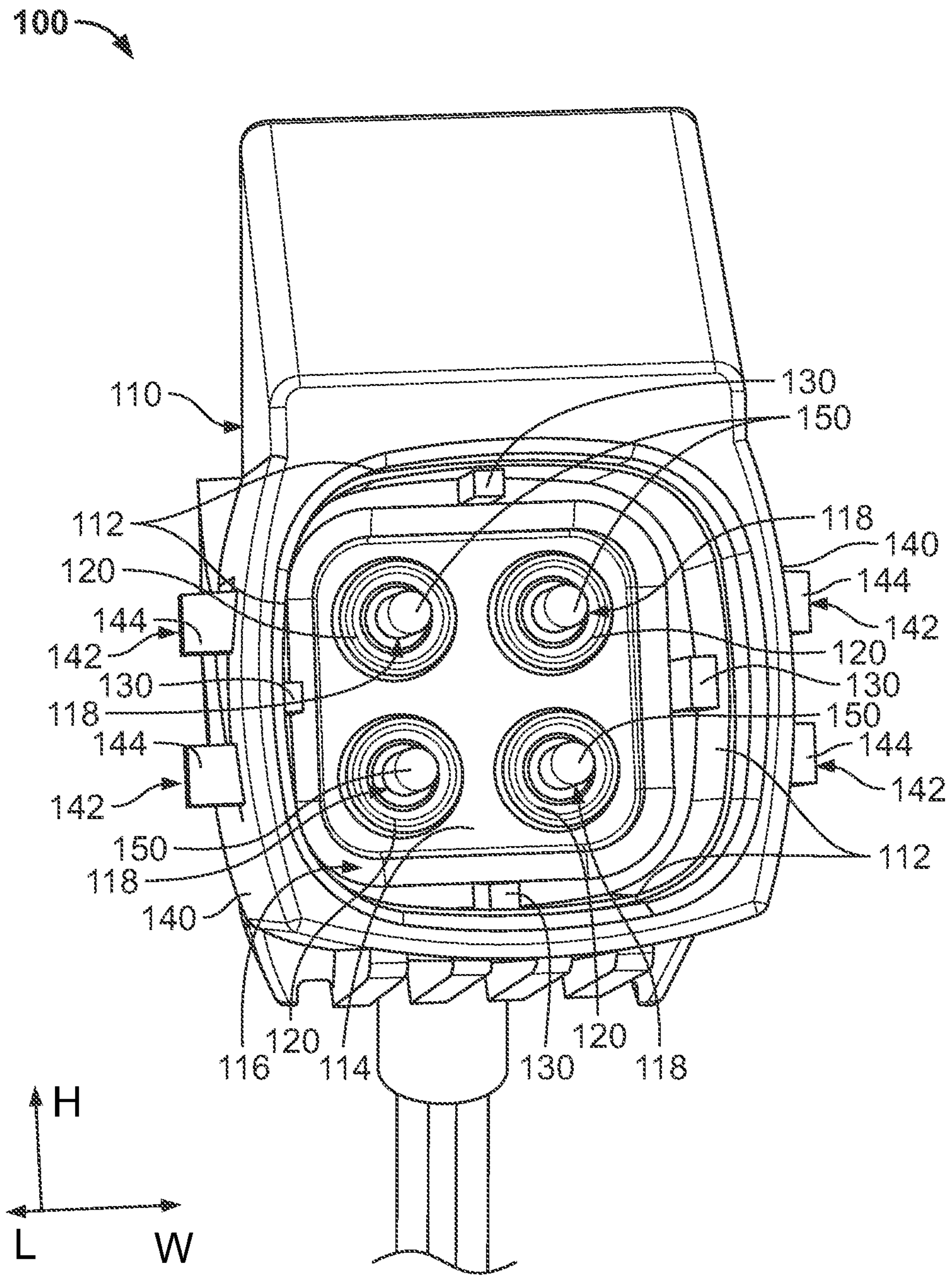
FIG. 2 is a perspective view of a first connector of the connector system.

The first connector 100, as shown in FIGS. 1 and 2, includes a first housing 110 and a plurality of pin terminals 150 disposed in the first housing 110.

The first housing 110, as shown in FIG. 2, has a plurality of inner sides 112 and a rear wall 114 defining a receptacle opening 116 extending into the first housing 110 along a longitudinal direction L. The receptacle opening 116 is delimited in a height direction H perpendicular to the longitudinal direction L and a width direction W perpendicular to both the height direction H and the longitudinal direction L by the inner sides 112. The receptacle opening 116 is delimited in the longitudinal direction L by the rear wall 114.

Figure 9A:
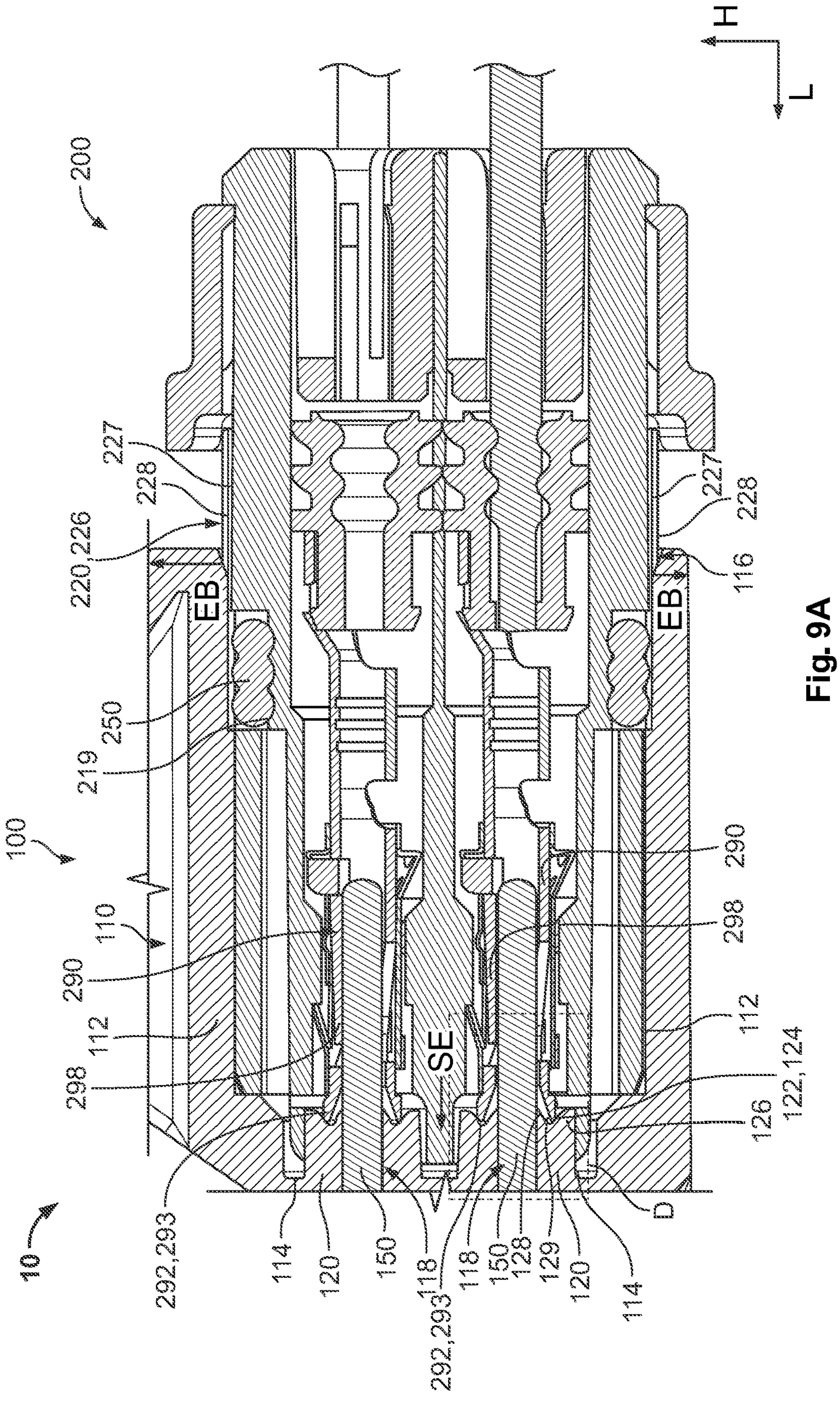
FIG. 9A is a sectional side view of the connector system.

As shown in FIGS. 2 and 9A, a plurality of pin terminal receiving passageways 118 extend through the rear wall 114 along the longitudinal direction L. The first housing 110 has a plurality of protrusions 120 extending from the rear wall 114 along the longitudinal direction L, with each of the protrusions 120 extending around one of the pin terminal receiving passageways 118.

Figure 9B:
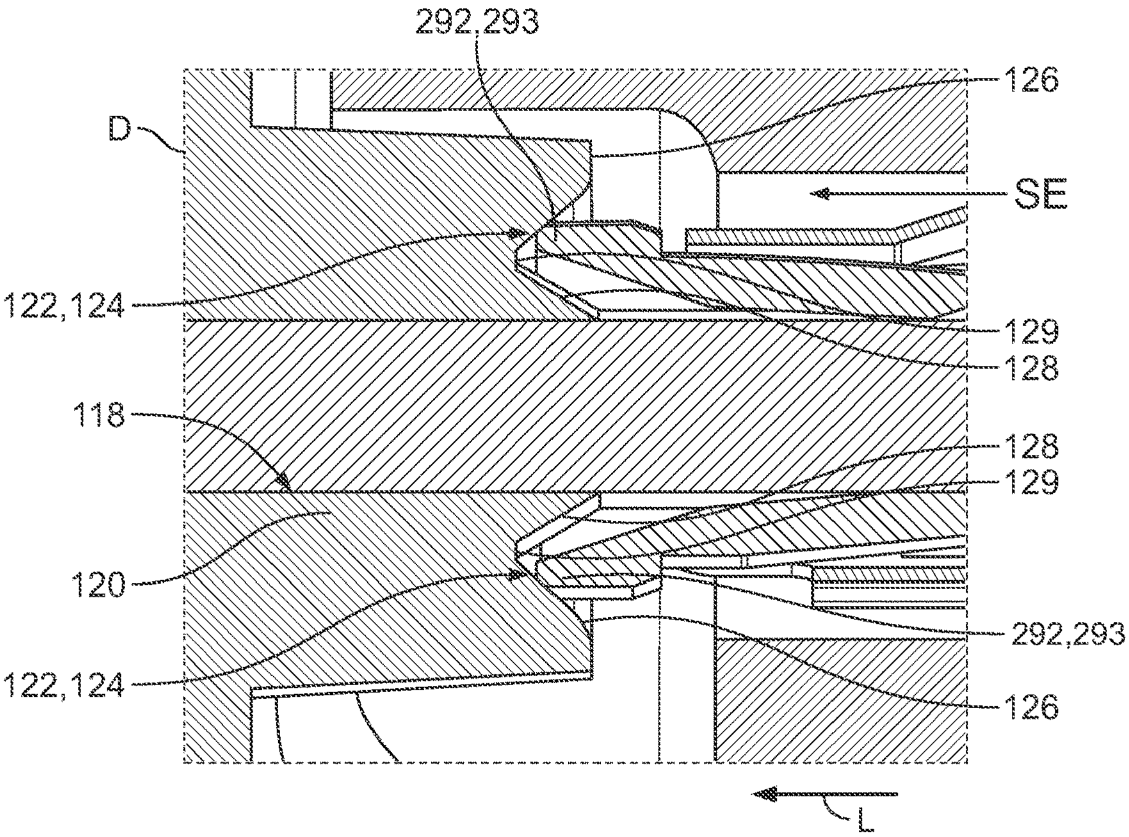
FIG. 9B is a sectional side view of a portion D of the connector system of FIG. 9A.

Each of the protrusions 120, as shown in the embodiments of FIGS. 9A-9E, has a contact surface 122 at an end opposite the rear wall 114 in the longitudinal direction L. FIGS. 9B-9E show various embodiment of the detail portion D shown in FIG. 9A; the embodiment in FIG. 9B is an enlarged view of the detail portion D in the embodiment of FIG. 9A, and FIGS. 9C-9E show different embodiments of the contact surface 122.

In the embodiment shown in FIGS. 9A and 9B, the contact surface 122 has an angular profile 124 extending circumferentially around the pin terminal receiving passageway 118. The angular profile 124 in the embodiment shown in FIGS. 9A and 9B has an exterior peak 126 distal from the pin terminal receiving passageway 118, an interior peak 128 adjacent to the pin terminal receiving passageway 118, and a recess 129 disposed between the exterior peak 126 and the interior peak 128. Only one of the protrusions 120 is labeled with the angular profile 124 and the elements of the angular profile 124 in FIGS. 9A and 9B for clarity of the drawings, however, the labels and description herein apply equally to each of the protrusions 120 in the shown embodiment.

Figure 9C:
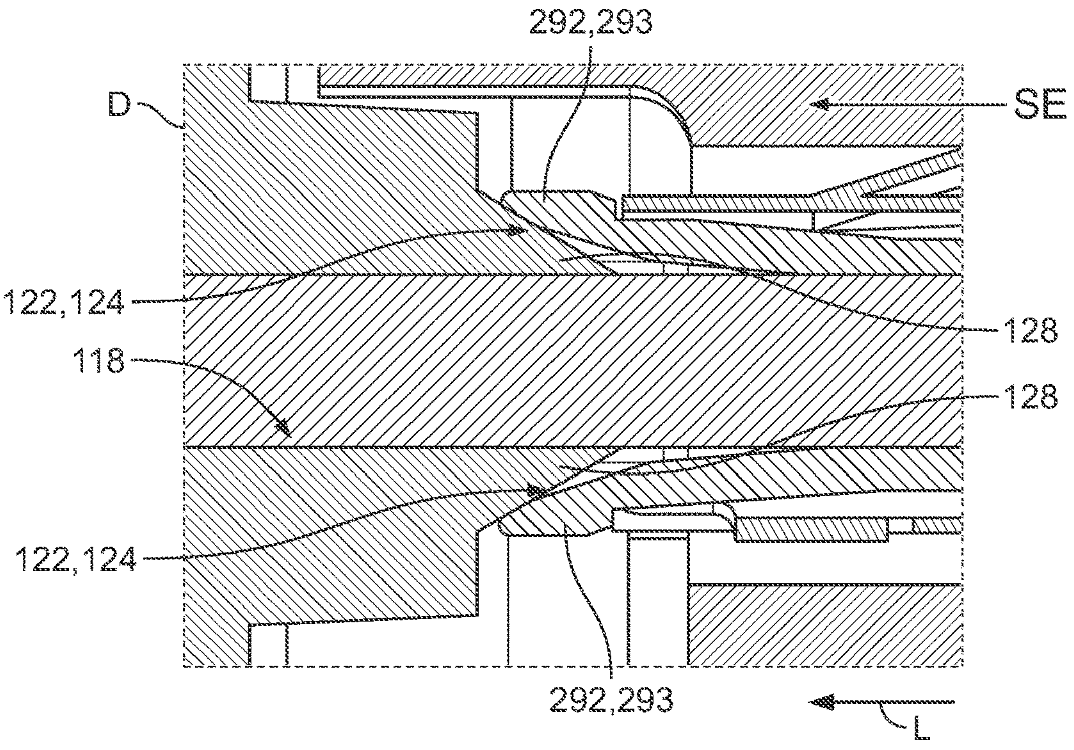
FIG. 9C is a sectional side view of the portion D of a connector system with a contact surface according to another embodiment.

In other embodiments, the angular profile 124 has only one of the exterior peak 126 and the interior peak 128. As shown in the embodiment of FIG. 9C, the angular profile 124 has only the interior peak 128, omitting the exterior peak 126, and slopes progressively further from the pin terminal receiving passageway 118 along the longitudinal direction L. In another embodiment, shown in FIG. 9D, the angular profile 124 has only the exterior peak 126, omitting the interior peak 128, and slopes progressively toward the pin terminal receiving passageway 118 along the longitudinal direction L. In another embodiment, shown in FIG. 9E, the contact surface 122 does not have the angular profile 124 but instead has a flat portion 123 facing toward the receptacle opening 116.

The first housing 110, as shown in FIG. 2, has a plurality of receptacle ribs 130 extending along the inner sides 112 in the longitudinal direction L. In the shown embodiment, each of the receptacle ribs 130 is positioned approximately centrally on one of the inner sides 112. In other embodiments, the receptacle ribs 130 may be positioned on less than all of the inner sides 112, more than one receptacle rib 130 may be positioned on at least one of the inner sides 112, or any other combination thereof.

The first housing 110, as shown in FIGS. 1 and 2, has a pair of exterior sides 140 opposite one another in the width direction W. Each of the exterior sides 140 has a pair of receptacle latching features 142 spaced apart from one another along the height direction H. Each of the receptacle latching features 142 has a ramp 144 extending progressively further from the exterior side 140 along the longitudinal direction L and a catch 146 at an end of the receptacle latching feature 142 in the longitudinal direction L.

The first housing 110 is formed from an insulative material. In the shown embodiment, the first housing 110 is monolithically formed in a single piece with at least the protrusions 120, the receptacle ribs 130, and the receptacle latching features 142. In other embodiments, the first housing 110 can be formed from separate pieces and assembled into the arrangement shown and described herein.

The pin terminals 150, as shown in FIGS. 2 and 9A, are each positioned in one of the pin terminal receiving passageways 118 and protrude into the receptacle opening 116. The pin terminals 150 are formed of a conductive material, such as aluminum, copper, or any other conductive material capable of being used in electrical terminal applications.

Figure 3:
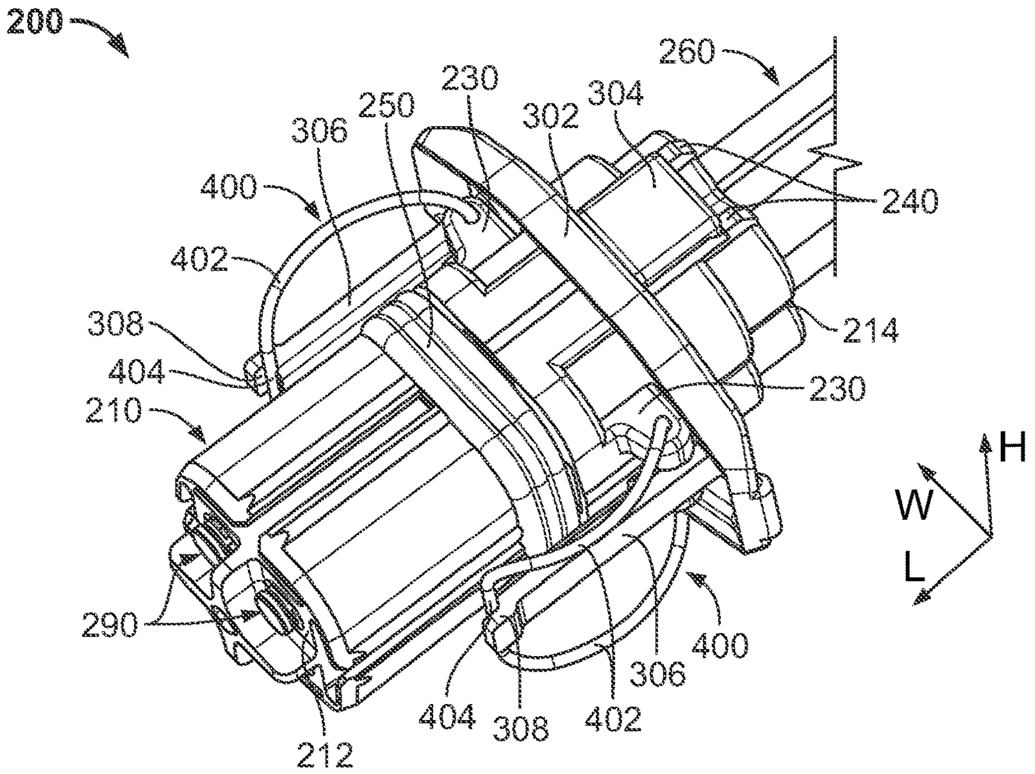
FIG. 3 is a perspective view of a second connector of the connector system.
Figure 7:
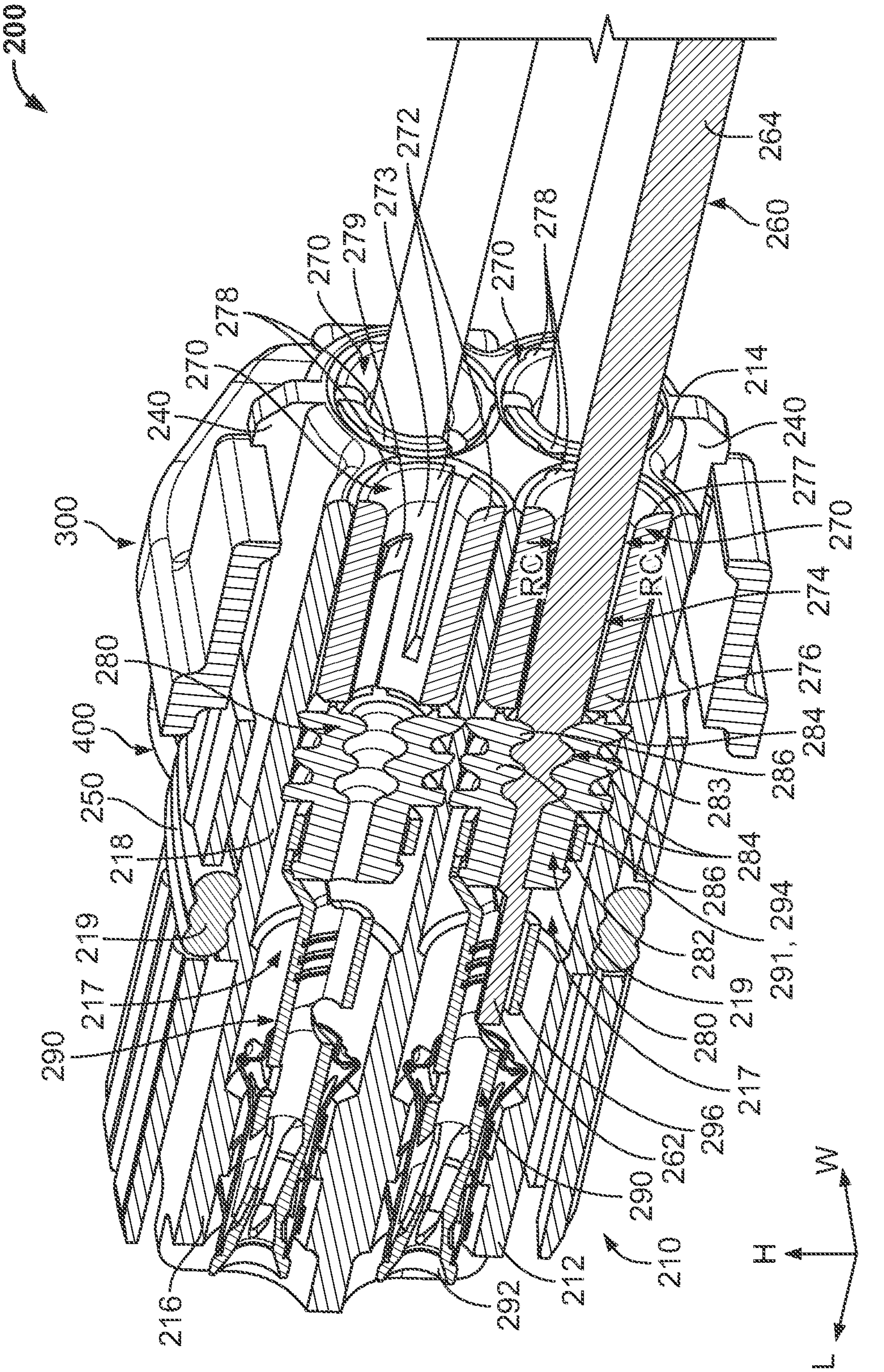
FIG. 7 is a sectional perspective view of the second connector.

The second connector 200, as shown in FIGS. 1, 3, and 7, includes a second housing 210, a housing seal 250 disposed around the second housing 210, a plurality of wires 260 extending into the second housing 210, a plurality of wire clamps 270, a plurality of wire seals 280, and a plurality of socket terminals 290 disposed in the second housing 210, a latching device 300 attached to the second housing 210, and a pair of springs 400 attached to the second housing 210.

Figure 4:
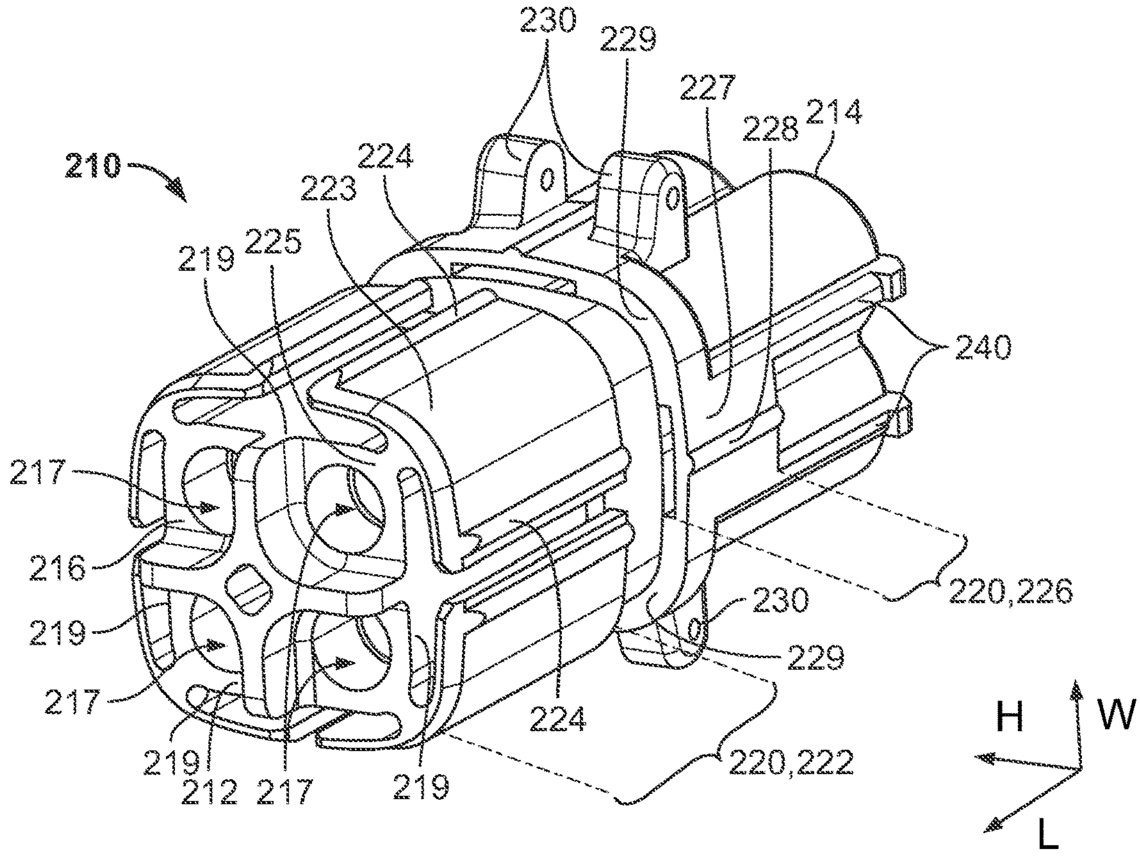
FIG. 4 is a perspective view of a second housing of the second connector.

The second housing 210, as shown in FIG. 4, has a first end 212 and a second end 214 opposite the first end 212 in the longitudinal direction L. A main body 216 of the second housing 210 extends along the longitudinal direction L from the first end 212 to the second end 214. The main body 216 has a plurality of wire receiving passageways 217 extending through the main body 216 in the longitudinal direction L from the first end 212 to the second end 214. The main body 216 has a plurality of exterior sides 219 surrounding the wire receiving passageways 217.

The second housing 210, as shown in FIG. 4, has a resilient shell 220 disposed around the main body 216 including a first resilient section 222 and a second resilient section 226.

As shown in FIG. 4, the first resilient section 222 extends around the main body 216 at the first end 212 and includes a plurality of cantilevers 223 and a plurality of first supports 225. The first supports 225, as shown in FIG. 4, are connected to the exterior sides 219 of the main body 216 and extend away from the exterior sides 219. A cantilever 223 is disposed at an end of each first support 225 opposite the main body 216. In the shown embodiment, each cantilever 223 extends in opposite directions from the first support 225 and approximately follows a contour of the exterior sides 219. The cantilever 223 is disposed at a distance in the width direction W or the height direction H from each of the exterior sides 219 over which it extends. Each cantilever 223 has a first bead 224 extending along the longitudinal direction L at each end of the cantilever 223 opposite the first support 225. The first bead 224 protrudes from the cantilever 223 in a direction away from the exterior sides 219.

In the embodiment shown in FIG. 4, the first resilient section 222 includes four first supports 225 and four cantilevers 223, with each of the cantilevers 223 extending over two of the exterior sides 219 of the main body 216. At an approximately central position over each exterior side 219, adjacent cantilevers 223 are separated by gap. In other embodiments, locations and quantities of the first supports 225 and the cantilevers 223 may vary; in many embodiments, at least one cantilever 223 is positioned at a distance from at least one of the exterior sides 219 in the width direction W and at least one cantilever 223 is positioned at a distance from at least one of the exterior sides in the height direction H. In other embodiments, the positioning of the first beads 224 may vary provided they serve the same function as described herein and, in other embodiments, the distance between the cantilever 223 and the exterior side 219 can vary provided the cantilever 223 is deflectable toward the exterior side 219.

As shown in FIG. 4, the second resilient section 226 extends around the main body 216 at a position between the first end 212 and the second end 214. The second resilient section 226 includes a plurality of beams 227 and a plurality of second supports 229. The second supports 229, as shown in FIG. 4, are connected to the exterior sides 219 of the main body 216 and extend away from the exterior sides 219. A beam 227 extends between two of the second supports 229 and is positioned over one of the exterior sides 219 at a distance from the exterior side 219 in the width direction W or the height direction H. Each beam 227 has a second bead 228 extending along the longitudinal direction L approximately centrally on the beam 227. The second bead 228 protrudes from the beam 227 in a direction away from the exterior sides 219.

In the embodiment shown in FIG. 4, the second resilient section 226 includes four second supports 229 and four beams 227, with each of the beams 227 extending over one of the exterior sides 219. In other embodiments, locations and quantities of the second supports 229 and the beams 227 may vary; in an embodiment, at least one beam 227 is positioned at a distance from at least one of the exterior sides 219 in the width direction W and at least one beam 227 is positioned at a distance from at least one of the exterior sides 219 in the height direction H. In other embodiments, the positioning of the second beads 228 may vary provided they serve the same function described herein and, in other embodiments, the distance between the beam 227 and the exterior side 219 can vary provided the beam 227 is deflectable toward the exterior side 219.

The second housing 210, as shown in FIGS. 3 and 4, has a plurality of spring posts 230 connected to the main body 216 and extending away from the exterior surfaces 219. In the shown embodiment, the second housing 210 has a pair of spring posts 230 on each of a pair of exterior surfaces 219 opposite one another in the width direction W. The spring posts 230 on each exterior surface 219 are spaced apart from one another in the height direction H. In other embodiments, the positioning and quantity of the spring posts 230 can vary provided the spring posts 230 are capable of the functions described herein.

The second housing 210, as shown in FIGS. 1, 3, 4, has a plurality of stops 240 at the second end 214. The stops 240 are connected to the main body 216 and extend away from the exterior surfaces 219. In other embodiments, the second housing 210 may only have a single stop 240 at the second end 214, or may have any other number of stops 240.

The second housing 210 is formed from an insulative material. In the shown embodiment, the second housing 210 is monolithically formed in a single piece with at least the main body 216, the resilient shell 220, the spring posts 230, and the stops 240. In other embodiments, the second housing 210 can be formed from separate pieces and assembled into the arrangement shown and described herein.

The housing seal 250, shown in FIGS. 3 and 7, is an elastomeric member. The housing seal 250 may be formed from a silicone material, a rubber material, or any other type of material that is capable of elastically deforming when pressed between two members.

Figure 5:
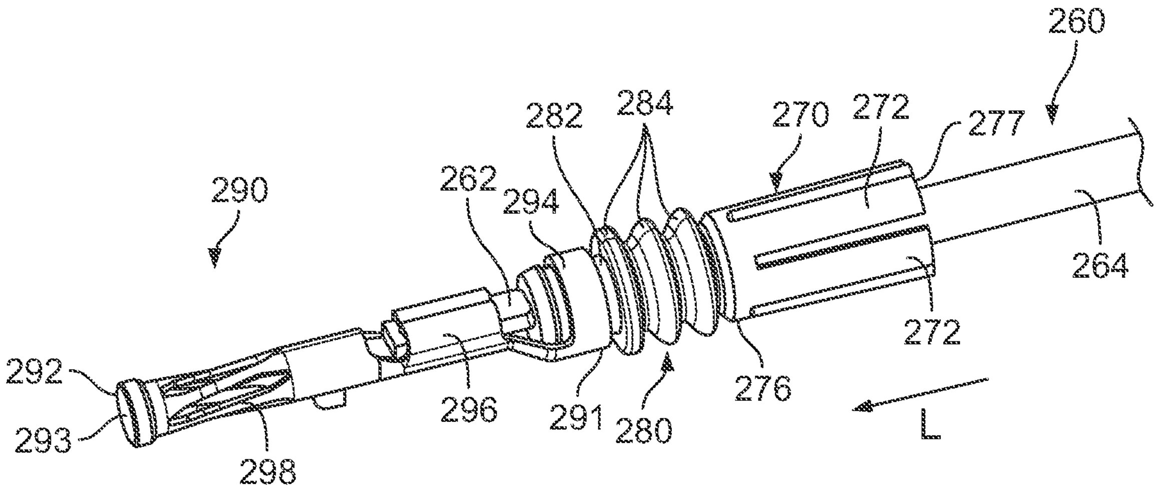
FIG. 5 is a perspective view of a wire, a wire clamp, a wire seal, and a socket terminal of the second connector.

Each of the wires 260, as shown in FIG. 5, has a conductor 262 surrounded by an outer insulation 264. The wire 260 may be any type of wire 260 that is used in electrical connector applications.

Figure 6:
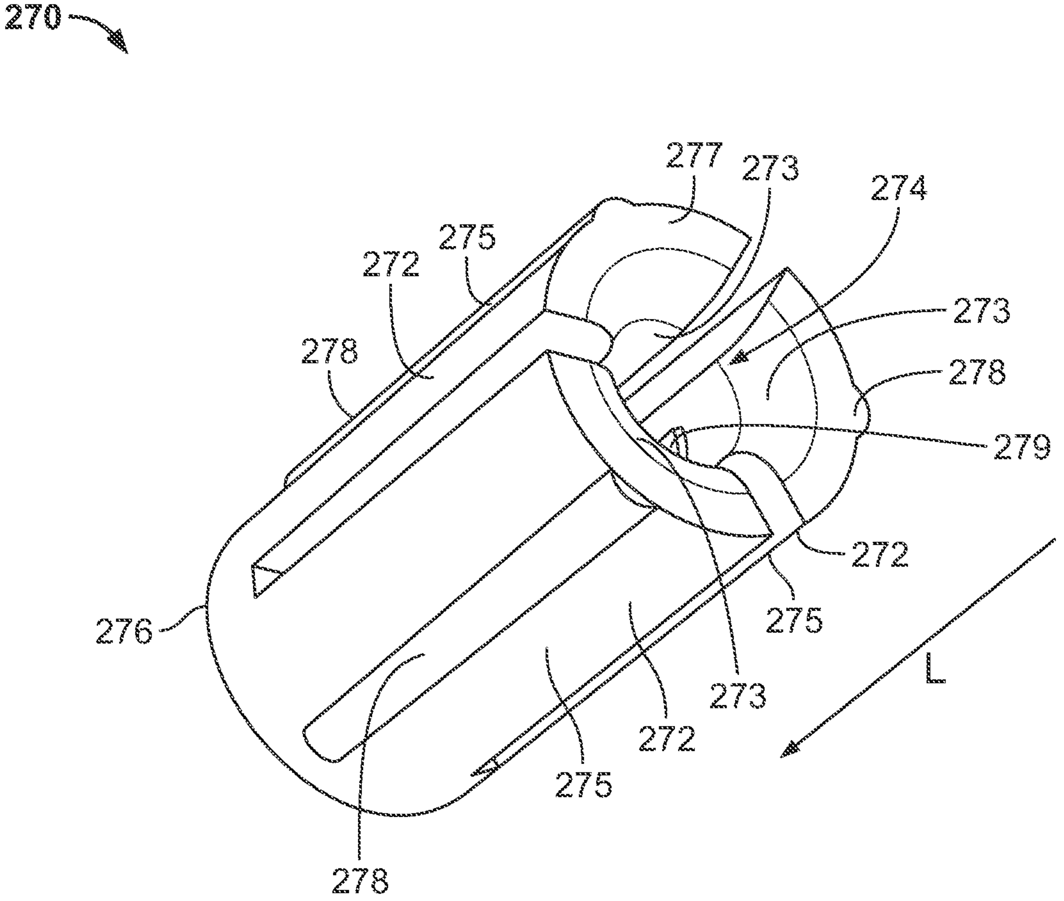
FIG. 6 is a perspective view of the wire clamp.

Each of the wire clamps 270, as shown in FIGS. 5 and 6, includes a plurality of clamp arms 272 extending between a connected end 276 and a separated end 277 along the longitudinal direction L. The clamp arms 272 are connected to each other at the connected end 276 and are separated from each other from the separated end 277 to a position adjacent the connected end 276 along the longitudinal direction L. In various embodiments, the amount of separation of the clamp arms 272 both from each other and along the longitudinal direction L can vary and is dictated by a desired radial displacement of the clamp arms 272.

Each of the clamp arms 272, as shown in FIG. 6, has an interior surface 273 and an exterior surface 275 opposite the interior surface 273. The interior surfaces 273 of the clamp arms 272 define a wire receiving passageway 274 that extends through the wire clamp 270 in the longitudinal direction from the connected end 276 to the separated end 277. Each of the clamp arms 272 has a clamp bead 278 extending along the exterior surface 275 in the longitudinal direction L. Each of the clamp arms 272, as shown in FIGS. 6 and 7, has a barb 279 extending from the interior surface 273 into the wire receiving passageway 274. In the shown embodiment, the clamp bead 278 and the barb 279 are positioned approximately centrally on the clamp arm 272. In other embodiments, the clamp bead 278 and the barb 279 may be positioned elsewhere on the clamp arm 272.

The wire clamp 270 is formed from an insulative material. In the shown embodiment, the wire clamp 270 is monolithically formed in a single piece with the clamp arms 272, the clamp beads 278, and the barbs 279. In other embodiments, the wire clamp 270 can be formed from separate pieces and assembled into the arrangement shown and described herein.

The wire seals 280, as shown in FIGS. 5 and 7, each have a seal body 282, a wire receiving passageway 283 extending through the seal body 282 along the longitudinal direction L, a plurality of external seal ribs 284 extending outward from the seal body 282, and a plurality of internal seal ribs 286 extending inwardly from the seal body 282 into the wire receiving passageway 283. In the shown embodiment, the wire seal 280 has three external seal ribs 284 and two internal seal ribs 286. In other embodiments, the wire seal 280 may have one external seal rib 284 or any number of external seal ribs 284, and may have one internal seal rib 286 or any number of internal seal ribs 286.

Each of the wire seals 280 is formed of an elastomeric material. The wire seal 280 may be formed from a silicone material, a rubber material, or any other type of material that is capable of elastically deforming when pressed between two members. In an embodiment, each of the wire seals 280 is monolithically formed in a single piece. In another embodiment, each of the wire seals 280 is molded together with one of the wire clamps 270, for example, by overmolding.

Each of the socket terminals 290 extends from an attached end 291 to an insertion end 292 along the longitudinal direction L, as shown in FIG. 5. The socket terminal 290 has a flared shape 293 at the insertion end 292. The socket terminal 290 has a seal crimping portion 294 at the attached end 291 and a conductor crimping portion 296 positioned adjacent to the seal crimping portion 294 along the longitudinal direction L. The socket terminal 290 has a resilient mating portion 298 between the conductor crimping portion 296 and the insertion end 292. In the shown embodiment, the resilient mating portion 298 is radially deflectable and includes a plurality of beams separated from one another. In other embodiments, the resilient mating portion 298 may be an elastic arm or any other resilient element of a terminal that mates with a mating terminal by elastic contact. The socket terminal 290 is formed from a conductive material, such as aluminum, copper, or any other type of material used in terminals for electrical connectors.

The latching device 300, as shown in FIGS. 1 and 3, includes a base 302, a pair of retention arms 304 extending from the base 302 along the longitudinal direction L, and a pair of resilient arms 306 extending from the base 302 along the longitudinal direction L and in a direction opposite the retention arms 304. Each of the resilient arms 306 has a notch 308 at an end opposite the base 302. The retention arms 304 are deflectable with respect to the base 302 along the height direction H and the resilient arms 306 are deflectable with respect to the base 302 along the width direction W.

The latching device 300, in an embodiment, is formed from an insulative material. In the shown embodiment, the latching device 300 is monolithically formed in a single piece with the base 302, the retention arms 304, and the resilient arms 306. In other embodiments, the latching device 300 can be formed from separate pieces and assembled into the arrangement shown and described herein. In another embodiment, the latching device 300 is formed from a metal material.

Each of the springs 400, as shown in FIGS. 1 and 3, has a pair of curved legs 402 and a crosspiece 404 connecting the curved legs 402 at an end. The springs 400 are formed of a resilient material, such as a metal, a plastic, or any other type of resilient material. In another embodiment, the springs 400 are monolithically formed with the latching device 300 of a metal material, for example, by stamping.

The assembly of the second connector 200 will now be described in greater detail.

As shown in FIGS. 5 and 7, one wire clamp 270 and one wire seal 280 are assembled on each of the wires 260. The wire 260 is inserted through the wire receiving passageway 274 of the wire clamp 270, entering the separated end 277 and exiting the connected end 276. The wire clamp 270 is positioned around the outer insulation 264 of the wire 260 with the barb 279 in abutment with the outer insulation 264. The wire 260 is inserted through the wire receiving passageway 283 of the wire seal 280. The internal seal ribs 286 elastically bear against the outer insulation 264 of the wire 260. The wire seal 280 is positioned adjacent to the wire clamp 270 along the longitudinal direction L in the shown embodiment.

The socket terminal 290 is crimped on the wire 260, as shown in FIGS. 5 and 7. The attached end 291 is positioned around the seal body 282 of the wire seal 280 and the seal crimping portion 294 is crimped around the seal body 282 to secure the attached end 291 to the seal body 282. The conductor 262 of the wire 260 is positioned in the conductor crimping portion 296. The conductor crimping portion 296 is crimped to the conductor 262 to secure the conductor crimping portion 296 to the conductor 262 and form an electrical connection between the socket terminal 290 and the conductor 262.

The wire 260 assembled with the wire clamp 270, the wire seal 280, and the socket terminal 290 is then inserted into one of the wire receiving passageway 217 of the main body 216 from the second end 214, as shown in FIGS. 3 and 7. The external seal ribs 284 elastically bear against an inner surface 218 of the wire receiving passageway 217. The connected end 726 of the wire clamp 270 first enters the wire receiving passageway 217 and, as the wire clamp 270 is further inserted, the clamp bead 278 on each of the clamp arms 272 abuts against the inner surface 218.

Further insertion of the wire clamp 270 into the wire receiving passageway 217 radially and elastically displaces the wire clamps 270 toward each other, applying a radial clamping force RC on the outer insulation 264. The barb 279 on each of the clamp arms 272 engages the outer insulation 264 to further secure the position of the wire clamp 270 with respect to the wire 260. The radial clamping force RC and the barb 279 limit the effects of vibration, shock, or other forces on the position of the wire 260 in the second housing 210. When fully inserted as shown in FIG. 7, the insertion end 292 of the socket terminal 290 protrudes from the first end 212 of the main body 216.

As shown in FIGS. 3, 4, and 7, the housing seal 250 is positioned around the exterior surfaces 219 of the main body 216. The housing seal 250 is held between the first resilient section 222 and the second resilient section 226 along the longitudinal direction L.

As shown in FIGS. 1 and 3, the springs 400 are attached to the spring posts 230 of the second housing 210. Each of the curved legs 402 is connected to a different one of the spring posts 230 and extends away from the spring posts 230 along the longitudinal direction L. The springs 400 are each rotatable about the point of connection to the spring posts 230.

The latching device 300 is attached to the second housing 210 as shown in FIGS. 1 and 3. The base 302 is positioned over the second end 214 of the main body 216 and moved along the main body 216 along the longitudinal direction L. During the movement, the retention arms 304 abut the stops 240 and elastically deflect away from the main body 216. After further movement of the latching device 300 along the longitudinal direction L, the retention arms 304 elastically return to the original position. The base 302 and the retention arms 304 are held along the longitudinal direction L between the spring posts 230 and the stops 240.

With the latching device 300 in position on the second housing 210 as shown in FIGS. 1 and 3, the resilient arms 306 each extend between a pair of spring posts 230 and between the curved legs 402 of the springs 400. The crosspiece 404 of each of the springs 400 is positioned in the notch 308 of one of the resilient arms 306. The elasticity of the springs 400 urges the latching device 300 along the longitudinal direction L toward the stops 240 and away from the spring posts 230 in the position shown in FIGS. 1 and 3, while securing the crosspiece 404 in the notch 308.

The mating of the first connector 100 with the second connector 200 to electrically connect the connectors 100, 200 of the connector system 10 will now be described in greater detail primarily with reference to FIGS. 1, 8, and 9A.

With the second connector 200 assembled as shown in FIGS. 3 and 7, the first end 212 is inserted into the receptacle opening 116 of the first housing 110. As shown in FIG. 8, in the shown embodiment, the receptacle ribs 130 are each positioned in one of the gaps between adjacent cantilevers 223. By insertion into the gaps, the receptacle ribs 130 require a particular orientation of inserting the second connector 200 into the receptacle opening 116.

Figure 8:
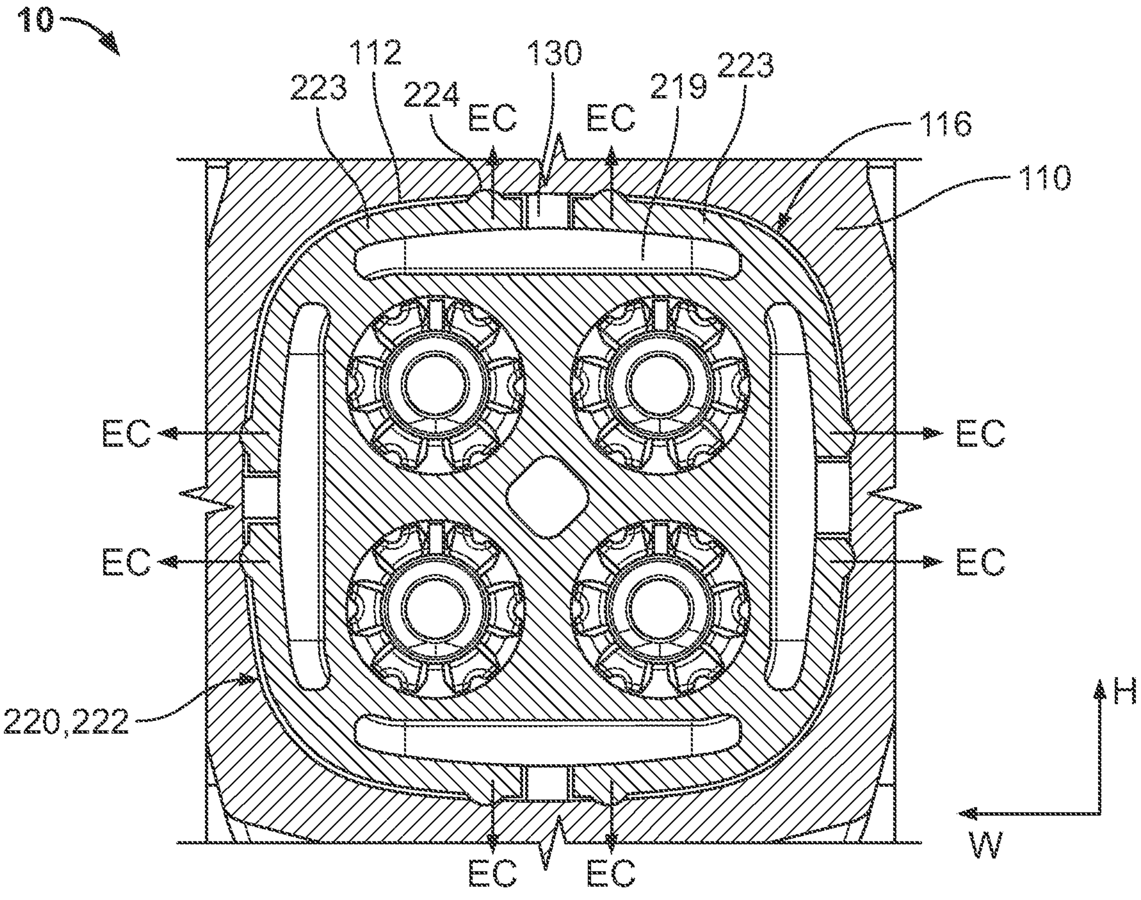
FIG. 8 is a sectional front view of the connector system.

As the second connector 200 is inserted into the receptacle opening 116 along the longitudinal direction L, the first bead 224 on each of the cantilevers 223 contacts one of the inner sides 112 of the first housing 110, as shown in FIG. 8. Upon further insertion of the second connector 200 in the longitudinal direction L, the contact of the first bead 224 with the inner side 112 resiliently deflects the cantilever 223 toward the exterior side 219 of the main body 216.

As shown in FIG. 8, the resilient deflection of the cantilever 223 applies an elastic cantilever force EC on the inner side 112, securing a tight fit between first resilient section 222 of the resilient shell 220 and the inner sides 112 of the first housing 110. In the embodiment shown in FIG. 8, the first resilient section 222 provides the elastic cantilever force EC to hold the second housing 210 in the height direction H and also provides the elastic cantilever force EC to hold the second housing 210 in the width direction W. In the shown embodiment, each of the cantilevers 223 provides the elastic cantilever force EC in both the width direction W and the height direction H. The deflection of the cantilever 223, in an embodiment, may also cause ends of the cantilever 223 adjacent to the receptacle ribs 130 to move into contact with sides of the receptacle ribs 130 and apply an additional force squeezing the receptacle ribs 130 from the sides. The elastic cantilever force EC limits the effects of vibration, shock, or other forces on the position of second housing 210 with respect to the first housing 110.

As the second connector 200 is further inserted in the longitudinal direction L into the receptacle opening 116, the second resilient section 226, shown in FIGS. 4 and 9A, likewise contacts the inner sides 112 of the first housing 110.

The second bead 228 on each of the beams 227 contacts one of the inner sides 112 and resiliently deflects the beam 227 toward the exterior side 219 of the main body 216. The resilient deflection of the beam 227 applies an elastic beam force EB on the inner side 112, as shown in FIG. 9A, further securing a tight fit. When the second connector 200 is fully inserted into the first connector 100, as shown in FIG. 9A, the second resilient section 226 engages the inner sides 112 at an open end of the receptacle opening 116, with part of the second resilient section 226 positioned in the receptacle opening 116 and part of the second resilient section 226 positioned outside of the receptacle opening 116.

In an embodiment, the second resilient section 226 provides the elastic beam force EB to hold the second housing 210 in both the height direction H and in the width direction W. In the shown embodiment, each of the beams 227 provides the elastic beam force EB in one of the height direction H and the width direction W. The elastic beam force EB further limits the effects of vibration, shock, or other forces on the position of second housing 210 with respect to the first housing 110.

As shown in FIG. 9A, when the second connector 200 is inserted into the receptacle opening 116, the housing seal 250 is compressed between the exterior sides 219 of the main body 216 and the inner sides 112 of the first housing 110.

The second connector 200 is inserted into the receptacle opening 116 with the springs 400 held in the notches 308 of the latching device 300, as shown in FIG. 3. As the second connector 200 is inserted into the receptacle opening 116, as shown in FIG. 1, the resilient arms 306 holding the springs 400 move along the exterior sides 140 of the first housing 110 in the longitudinal direction L. At a point along the longitudinal direction L during insertion, the crosspiece 404 of each of the springs 400 contacts the ramp 144 of both of the receptacle latching features 142 on one of the exterior sides 140 and rides up the ramps 144. The resilient arm 306 is positioned between the receptacle latching features 142 but, as the spring 400 rides up the ramps 144 and moves away from the exterior side 140, the resilient arm 306 deflects away from the exterior side 140. The deflection of the resilient arm 306 continues to urge the spring 400 toward the exterior side 140 as the spring 400 rides up the ramp 144.

When the second connector 200 is fully inserted into the receptacle opening 116, as shown in FIG. 1, the crosspiece 404 of each of the springs 400 reaches the end of the ramps 144 in the longitudinal direction L. The force provided by deflection of the resilient arm 306 moves the crosspiece 404 back toward the exterior side 140 and behind the catch 146 of each of the receptacle latching features 142 on the exterior side 140. The resilient arm 306 holding the spring 400 and deflecting to continue urging the spring 400 toward the exterior sides 140 allows the latching of the spring 400 to the receptacle latching features 142 in a single motion of the second connector 200 along the longitudinal direction L, without any intervention required to re-position the spring 400 during mating.

The springs 400 positioned behind the catches 146 secure a mating position of the second connector 200 in the first connector 100 shown in FIG. 1 along the longitudinal direction L. The springs 400 are stretched in this position and apply a spring elastic force SE on the second connector 200 along the longitudinal direction L directed into the receptacle opening 116.

In the mated position of the first connector 100 and the second connector 200, as shown in FIGS. 1 and 9A, the pin terminals 150 each move into contact with the resilient mating portion 298 of one of the socket terminals 290, electrically connecting the first connector 100 with the second connector 200.

Figure 9D:
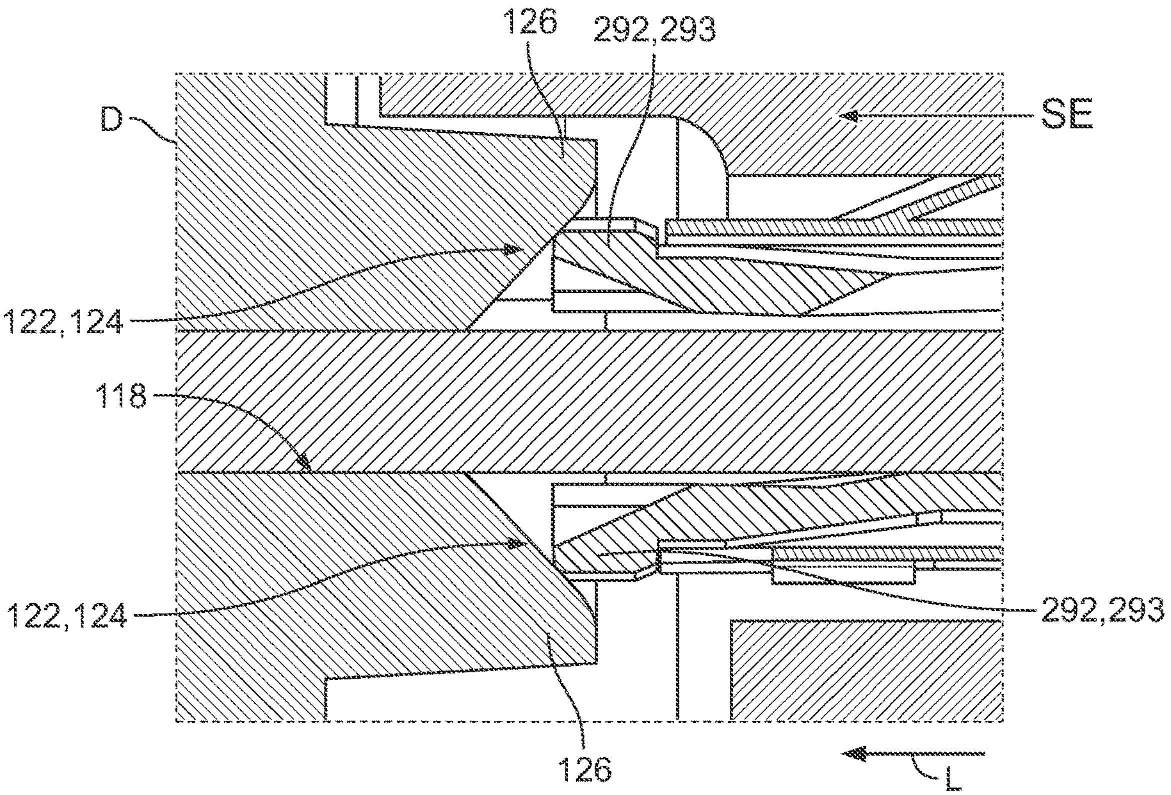
FIG. 9D is a sectional side view of the portion D of a connector system with a contact surface according to another embodiment.
Figure 9E:
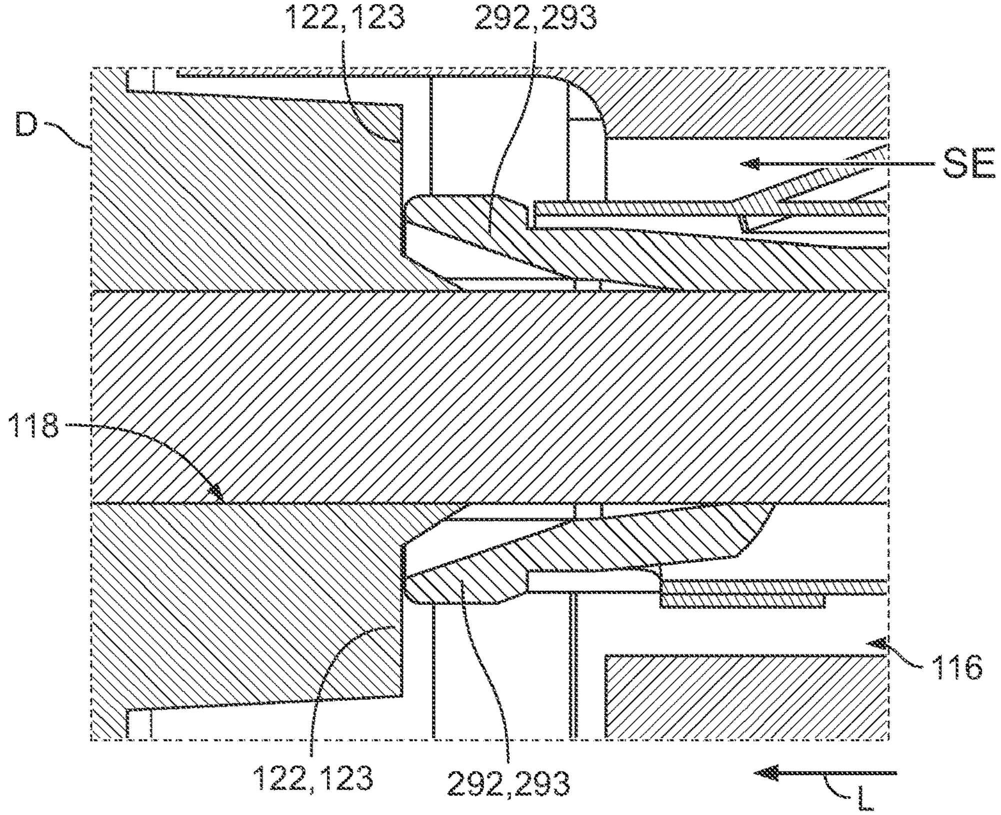
FIG. 9E is a sectional side view of the portion D of a connector system with a contact surface according to another embodiment.

In the mated position shown in FIG. 9A, the flared shape 293 of the insertion end 292 of each of the socket terminals 290 abuts against the contact surface 122 of one of the protrusions 120 of the first housing 110. The flared shape 293 is urged against the angular profile 124 of the contact surface 122 by the spring elastic force SE, forcing the flared shape 293 into the recess 129 of the protrusion 120 between the exterior peak 126 and the interior peak 128, as shown in FIGS. 9A and 9B. In other embodiments, as described above, the spring elastic force SE can urge the flared shape 293 against the angular profile 124 having only one of the peaks 126, 128, as shown in FIGS. 9C and 9D, or can urge the flared shape 193 against the flat portion 123 of the protrusion 120 instead of the angular profile 124, as shown in FIG. 9E. In an embodiment, only the socket terminals 290 of the second connector 200 abut the rear wall 114 in the mated position.

The interaction of the flared shape 293 with the angular profile 294 centers the socket terminal 290 around the pin terminal receiving passageway 118 and restricts movement of the socket terminal 290 in the height direction H and the width direction W. The spring elastic force SE holding the flared shape 293 in the angular profile 294 further dampens any movement in the height direction H and the width direction W while also further restricting movement along the longitudinal direction L. Both the interactions of the socket terminal 290 with the protrusion 120 and the spring elastic force SE limit the effects of vibration, shock, or other forces on the connector system 10.

Figure 10:
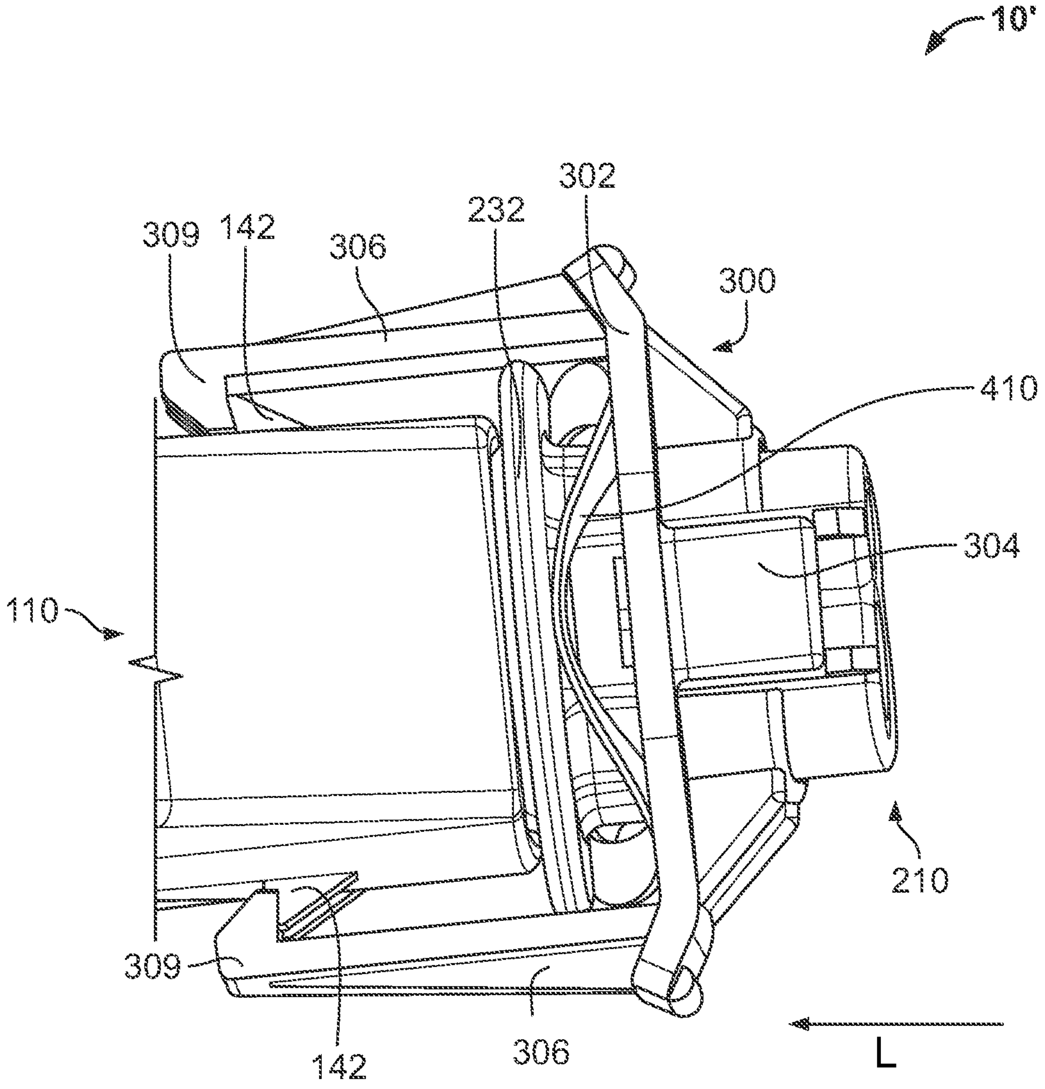
FIG. 10 is a perspective view of a connector system according to another embodiment.

A connector system 10' according to another embodiment is shown in FIG. 10. Like reference numbers refer to like elements and only the differences from the connector system 10 shown and described with respect to FIGS. 1-9 above will be described in detail herein.

The latching device 300, as shown in FIG. 10, has the base 302, the retention arms 304 extending from the base 302, and the resilient arms 306 extending from the base 302. At an end of the resilient arms 306 opposite the base 302, instead of the notch 308, each of the resilient arms 306 has a hook 309. As shown in FIG. 10, the second housing 210 has a flange 232 extending circumferentially around the second housing 210 instead of the spring posts 230. The connector system 10' includes a wave spring 410 in lieu of the springs 400 that is positioned between the base 302 and the flange 232.

In the embodiment of the connector system 10' shown in FIG. 10, the resilient arms 306 similarly deflect to move the hooks 309 into engagement with the receptacle latching features 142 as described in the embodiment above. The compression of the wave spring 410 between the base 302 and the flange 232 in the mating position shown in FIG. 10 provides a force securing the engagement of the latching device 300 with the receptacle latching features 142 along the longitudinal direction L.

Figure 11:
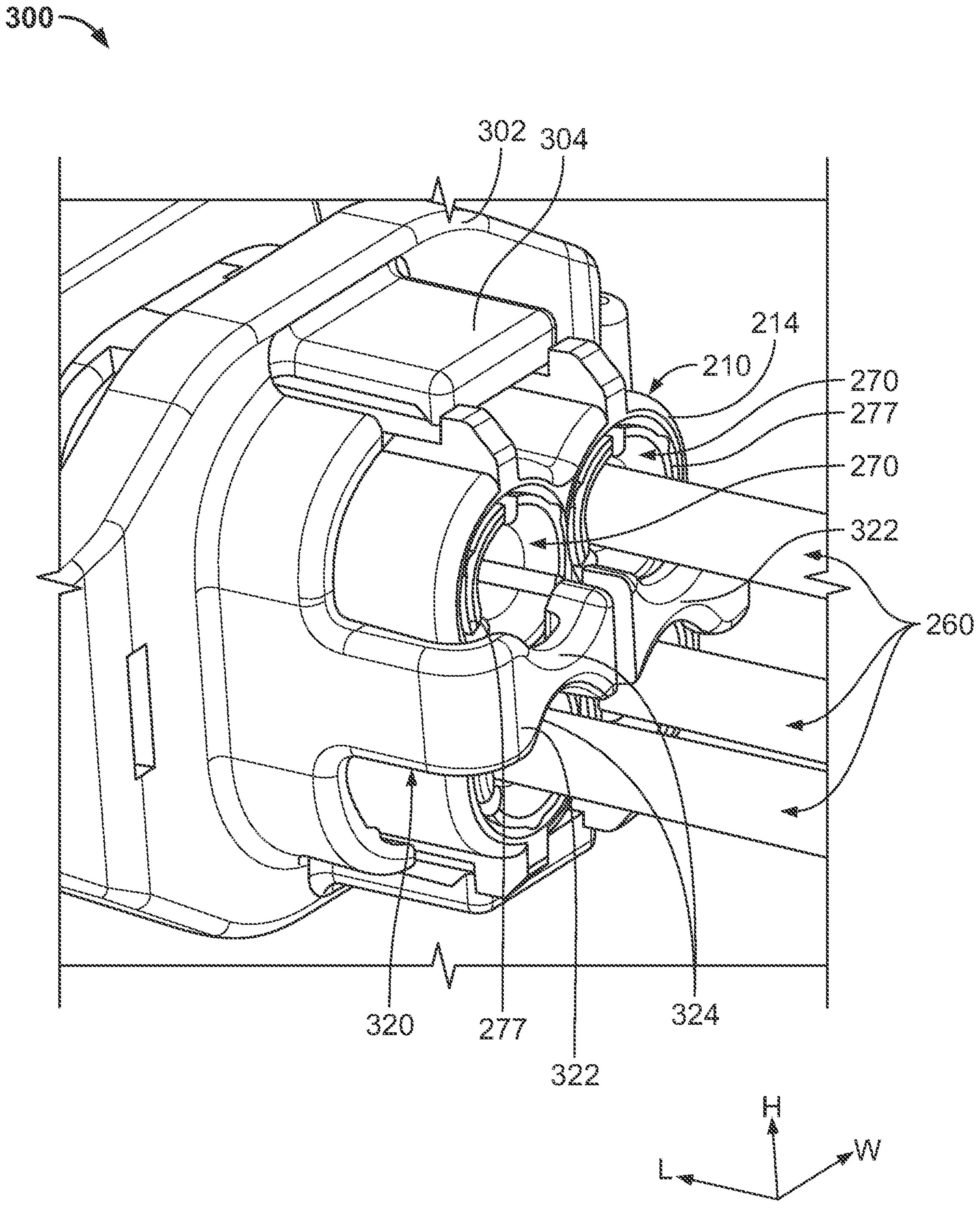
FIG. 11 is a perspective view of a second connector with a latching device according to another embodiment.

In another embodiment shown in FIG. 11, the latching device 300 includes a plurality of retention members 320 extending from the base 302. Each of the retention members 320 is formed in an approximate L-shape and has a retention portion 322 extending along the width direction W and spaced apart from the base 302 along the longitudinal direction L. In the shown embodiment, the retention members 320 are monolithically formed in a single piece with the latching device 300.

As shown in FIG. 11, when the latching device 300 is attached to the second housing 210, the retention portions 322 are positioned over the second end 214 of the second housing 210. The retention portions 322 abut the separated end 277 of each of the wire clamps 270 that are radially compressed within the wire receiving passageways 217. The retention portions 322 prevent movement of the wire clamps 270 out of the wire receiving passageways 217 along the longitudinal direction L, further securing the position of the wires 260 in the wire receiving passageways 217 against the effects of vibration, shock, or other forces. The embodiment of the latching device 300 shown in FIG. 11 can be applied to either the connector system 10 shown in FIGS. 1-9 or the connector system 10' shown in FIG. 10.

In the embodiments shown and described above, the first connector 100 is a receptacle connector and the first housing 110 is a receptacle housing. The second connector 200 is a plug connector and the second housing 210 is a plug housing. In other embodiments, the first connector 100 could be a plug connector, with the first housing 110 as a plug housing, and the second connector 200 could be a receptacle connector, with the second housing 210 as a receptacle housing. For example, the first housing 110 could be configured with some of the elements described herein exposed on the exterior sides 140 of the first housing 110 instead of within the receptacle opening 116, and the second housing 120 could be configured with some of the elements described herein on an interior side of the second housing 120.

The elements of the embodiments of the connector system 10, provided they retain similar functions as described herein, could be arranged on either a receptacle connector or a plug connector, or some elements described as part of the first connector 100 could be positioned on the second connector 200 and vice versa. The shown exemplary embodiment of a receptacle connector as the first connector 100 and a plug connector as the second connector 200, with the elements allocated to the respective connectors 100, 200, is merely illustrative and is not intended to limit the features of the connector system 10 described herein, which could be arranged differently but remain within the scope of the disclosure.

What is claimed is:

1. A connector system, comprising:

a first connector including a first housing, the first housing has a rear wall, the rear wall has a pin terminal receiving passageway extending through the rear wall and a protrusion extending from the rear wall, the protrusion has a contact surface with an angular profile extending circumferentially around the pin terminal receiving passageway; and a second connector including a second housing, a socket terminal disposed within the second housing, and a spring connected to the second housing, the spring engages with the first housing in a mating position of the second connector with the first connector and provides a spring elastic force pressing the socket terminal against the protrusion.

2. The connector system of claim 1, wherein the first connector has a pin terminal positioned in the pin terminal receiving passageway and connected with the socket terminal in the mating position.

3. The connector system of claim 1, wherein an insertion end of the socket terminal has a flared shape, the flared shape is urged against the angular profile by the spring elastic force.

4. The connector system of claim 3, wherein the angular profile has at least one of an exterior peak and an interior peak and extends in a sloped manner with respect to the pin terminal receiving passageway.

5. The connector system of claim 4, wherein the angular profile has the exterior peak and the interior peak, the flared shape is held in a recess between the exterior peak and the interior peak by the spring elastic force.

6. The connector system of claim 2, wherein the protrusion has a contact surface with a flat portion, an insertion end of the socket terminal is urged against the flat portion by the spring elastic force.

7. The connector system of claim 1, wherein the spring has a pair of curved legs connected to the second housing and a crosspiece extending between the curved legs.

8. The connector system of claim 7, wherein the second connector includes a latching device attached to the second housing, the latching device has a base and a resilient arm extending from the base, the resilient arm is deflectable with respect to the base.

9. The connector system of claim 8, wherein the crosspiece of the spring is held in a notch of the resilient arm at an end of the resilient arm opposite the base.

10. The connector system of claim 9, wherein the first housing has a receptacle latching feature with a ramp extending from an exterior side of the first housing.

11. The connector system of claim 10, wherein the crosspiece contacts the ramp during insertion of the second connector into the first connector, deflecting the resilient arm away from the exterior side of the first housing, the resilient arm urging the spring toward the exterior side of the first housing.

12. The connector system of claim 10, wherein the spring engages the receptacle latching feature in the mating position to provide the spring elastic force.

13. The connector system of claim 8, wherein the latching device has a retention arm extending from the base and abutting a stop of the second housing.

14. A connector system, comprising:

a first connector including a first housing, the first housing has a rear wall with a protrusion extending from the rear wall; and a second connector including a second housing, a socket terminal disposed within the second housing, a spring connected to the second housing, and a latching device attached to the second housing, the spring engages with the first housing in a mating position of the second connector with the first connector and provides a spring elastic force pressing the socket terminal against the protrusion, the latching device has a base and a resilient arm extending from the base, the resilient arm is deflectable with respect to the base.

* * * * *